United States Patent
Bucknell et al.

(10) Patent No.: US 10,616,823 B2
(45) Date of Patent: Apr. 7, 2020

(54) ACCESS METHOD OF WIRELESS COMMUNICATION NETWORK

(71) Applicant: FUJITSU LIMITED, Kawasaki-shi, Kanagawa (JP)

(72) Inventors: Paul Bucknell, Brighton (GB); Yiwei Fang, High Wycombe (GB); Dorin Viorel, Sunnyvale, CA (US); Timothy Moulsley, Caterham (GB)

(73) Assignee: FUJITSU LIMITED, Kawasaki (JP)

( * ) Notice: Subject to any disclaimer, the term of this patent is extended or adjusted under 35 U.S.C. 154(b) by 94 days.

(21) Appl. No.: 15/182,114

(22) Filed: Jun. 14, 2016

(65) Prior Publication Data
US 2016/0295503 A1  Oct. 6, 2016

Related U.S. Application Data

(63) Continuation of application No. PCT/EP2014/061907, filed on Jun. 6, 2014.

(30) Foreign Application Priority Data

Jan. 31, 2014 (EP) ..................................... 14153559

(51) Int. Cl.
*H04W 48/16* (2009.01)
*H04W 74/00* (2009.01)
(Continued)

(52) U.S. Cl.
CPC ....... *H04W 48/16* (2013.01); *H04W 72/0446* (2013.01); *H04W 72/0453* (2013.01);
(Continued)

(58) Field of Classification Search
CPC ............... H04W 48/16; H04W 74/006; H04W 74/0833; H04W 72/0453; H04W 72/0446; H04W 76/027; H04W 76/18
(Continued)

(56) References Cited

U.S. PATENT DOCUMENTS 7,212,809 B2 * 5/2007 Khawand .............. H04W 28/24
455/414.1
2004/0242199 A1 * 12/2004 Edlund ................. H04W 8/245
455/411
(Continued)

FOREIGN PATENT DOCUMENTS

CN 102223729 A 10/2011
CN 102378211 A 3/2012
(Continued)

OTHER PUBLICATIONS

Notification of Reasons for Refusal issued by the Japan Patent Office for corresponding Japanese Patent Application No. 2016-549050, dated Aug. 15, 2017, with an English translation.
(Continued)

*Primary Examiner* — Faisal Choudhury
(74) *Attorney, Agent, or Firm* — Myers Wolin, LLC

(57) ABSTRACT

An access method of a device (10) such as an MTC device to a network (20, 30, 40) which allows the transmission of small data packets without the need to read all the System Information normally required to make an initial network access. The device (10) may notify the network that an access request is occurring from a device that was either specifically allowed to use a stored access configuration or is accessing the cell using modified system information being broadcast by the cell. Such notification may be implicit in the characteristics (choice of preamble, timing, frequency and/or repetition) of the access request. The network, preferably having knowledge of the method being used by the device to access the network, can either reject this access or accept it depending on whether the access was from a stored configuration or read from System Information.

17 Claims, 8 Drawing Sheets

(51) Int. Cl.
*H04W 76/18* (2018.01)
*H04W 72/04* (2009.01)
*H04W 74/08* (2009.01)

(52) U.S. Cl.
CPC ..... *H04W 74/006* (2013.01); *H04W 74/0833* (2013.01); *H04W 76/18* (2018.02)

(58) Field of Classification Search
USPC ......................................................... 370/329
See application file for complete search history.

(56) References Cited

U.S. PATENT DOCUMENTS

| | | | |
|---|---|---|---|
| 2005/0153700 A1 | 7/2005 | Farnsworth et al. | |
| 2008/0268893 A1* | 10/2008 | Lee ..................... | H04W 52/146 |
| | | | 455/522 |
| 2010/0150094 A1* | 6/2010 | Stanwood .......... | H04Q 11/0478 |
| | | | 370/329 |
| 2010/0255847 A1 | 10/2010 | Lee et al. | |
| 2011/0117912 A1 | 5/2011 | Mahajan et al. | |
| 2011/0244907 A1 | 10/2011 | Golaup et al. | |
| 2012/0250630 A1* | 10/2012 | Paiva ................. | H04W 74/0833 |
| | | | 370/329 |
| 2012/0254890 A1 | 10/2012 | Li et al. | |
| 2012/0281531 A1 | 11/2012 | Susitaival | |
| 2012/0281580 A1 | 11/2012 | Lee et al. | |
| 2012/0294146 A1 | 11/2012 | Wu | |
| 2013/0051325 A1 | 2/2013 | Ryu et al. | |
| 2013/0051338 A1* | 2/2013 | Ryu ..................... | H04W 4/005 |
| | | | 370/329 |
| 2013/0217400 A1* | 8/2013 | Zhang ................ | H04W 72/082 |
| | | | 455/450 |
| 2013/0336186 A1* | 12/2013 | Damnjanovic ..... | H04L 12/4633 |
| | | | 370/311 |
| 2014/0050185 A1* | 2/2014 | Hooli .................. | H04L 5/0053 |
| | | | 370/329 |
| 2014/0056246 A1* | 2/2014 | Chun ................. | H04W 52/0216 |
| | | | 370/329 |
| 2014/0161049 A1 | 6/2014 | Viorel et al. | |
| 2014/0177534 A1* | 6/2014 | McHardy ............. | H04W 72/04 |
| | | | 370/329 |
| 2015/0009813 A1* | 1/2015 | Nguyen ............. | H04W 74/002 |
| | | | 370/230 |
| 2015/0055448 A1* | 2/2015 | Lee ......................... | H04B 7/26 |
| | | | 370/216 |
| 2015/0326995 A1 | 11/2015 | Li et al. | |
| 2015/0334746 A1* | 11/2015 | Sun ...................... | H04B 17/309 |
| | | | 370/329 |

FOREIGN PATENT DOCUMENTS

| | | |
|---|---|---|
| CN | 102378306 A | 3/2012 |
| CN | 103220811 A | 7/2013 |
| JP | 2009-111624 A | 5/2009 |
| WO | 99/41845 A1 | 8/1999 |
| WO | 2007/113457 A1 | 10/2007 |
| WO | 2013/110331 A1 | 8/2013 |

OTHER PUBLICATIONS

Extended European search report with supplementary European search report and the European search opinion issued by the European Patent Office for corresponding European Patent Application No. 17163510.5, dated Jun. 9, 2017.
Extended European Search Report issued for co-pending European Patent Application No. 14153559.1, dated Jul. 4, 2014.
International Search Report with Written Opinion issued by the International Searching Authority for corresponding International Patent Application No. PCT/EP2014/061907, dated Sep. 30, 2014.
First Notification of Office Action issued by the China National Intellectual Property Administration for corresponding Chinese Patent Application No. 201480074029.2, dated Feb. 26, 2019, with an English translation.

* cited by examiner

ACCESS METHOD OF WIRELESS COMMUNICATION NETWORK

CROSS REFERENCES TO RELATED APPLICATIONS

This application claims priority from International Patent Application No. PCT/EP2014/061907, filed Jun. 6, 2014 and foreign priority from European Patent Application No. EP14153559.1 filed Jan. 31, 2014 the contents of each are herein wholly incorporated by reference.

FIELD OF THE INVENTION

The present invention relates to a method of accessing a wireless communication system comprising a base station and subscriber stations for transmitting transmission data to the base station. The present invention further relates to a subscriber station, to a base station and a computer program for use in said method.

Particularly, but not exclusively, the present invention relates to network access procedures in accordance with the LTE (Long Term Evolution) and LTE-Advanced radio technology standards as, for example, described in the 3GPP TS36 series specifications, Release 9, 10 and subsequent of the 3GPP specification series. However, the present invention is also applicable to UMTS, WiMAX and other communication systems in which a subscriber station (also referred to as "user terminal", "user equipment" or UE, "mobile terminal" etc.) attempts access using a random access method.

BACKGROUND OF THE INVENTION

Wireless communication systems are widely known in which base stations (BSs) provide "cells" and communicate with subscriber stations within range of the BSs. In LTE for example, the base stations are generally called eNBs or eNBs and the subscriber stations are called user equipments or UEs.

As an embodiment of the present invention will be described later with respect to LTE, it may be worth briefly outlining some relevant aspects of LTE network topology.

The network topology in LTE is illustrated in FIG. 1. As can be seen, each UE 10 connects over a wireless link via a Uu interface to an eNB 20. It should be noted that various types of eNB are possible having differing transmit powers and therefore providing coverage areas (cells) of differing sizes. Multiple eNBs deployed in a given geographical area constitute a wireless network called the E-UTRAN (and henceforth generally referred to simply as "the network").

Each eNB 20 in turn is connected by a (usually) wired link using an interface called S1 to higher-level or "core network" entities, including a Serving Gateway (S-GW) 40, and a Mobility Management Entity (MME) 30 for managing the system and sending control signalling to other nodes, particularly eNBs, in the network. In addition (not shown), a Packet Data Network (PDN) Gateway (P-GW) 50 is present, separately or combined with the S-GW, to exchange data packets with any packet data network including the Internet. As shown in FIG. 1, the eNBs 20 communicate among themselves by a (usually) wireless link, using an X2 interface for mutual co-ordination, for example when handing over a UE 10 from one eNB to another.

In such a system, each BS divides its available frequency and time resources in a given cell, into individual resource allocations for the user equipments which it serves, in other words those UEs which have a connection with the BS. The user equipments are generally mobile and therefore may move among the cells, prompting a need for handovers of radio communication links between the base stations of adjacent cells. RRC, or Radio Resource Control, is responsible among other things for signalling related to connection management and handovers to other base stations. A user equipment may be in range of (i.e. able to detect signals from) several cells at the same time, but in the simplest case it communicates with one "serving" cell or "primary" cell. A wireless communication system, and the cells within it, may be operated in FDD (Frequency Division Duplex) or TDD (Time Division Duplex) mode.

FIG. 2 shows the basic units used for resource allocation in the LTE system. Resources in the system have both a time dimension and a frequency dimension. Time in the system is divided in units of a symbol time or "slot" (where a "slot" has typically a duration of seven symbol times), as indicated in FIG. 2. Two successive slots form a "subframe" and (in this example) ten subframes form a "frame". The frequency bandwidth available in the system is divided into a number of sub-carriers.

The resources available for use by specific UEs are allocated by a scheduling function at the eNB. Such scheduling is usually determined separately for each subframe; in other words the resource allocation of a UE may vary from one subframe to the next. Resources are allocated to UEs both for downlink (DL) and uplink (UL) transmission. UEs which have established a connection with the eNB are synchronized with the eNB and configured with a suitable timing advance (if necessary), so that their allocated downlink and uplink resources can be fully "orthogonal" (non-interfering) with those of other UEs.

In LTE, several channels for data and control signalling are defined at various levels of abstraction within the system.

FIG. 3 shows some of the channels defined in LTE at each of a logical level, transport layer level and physical layer level, and the mappings between them.

At the physical layer level, on the downlink, each eNB broadcasts a number of channels and signals to all UEs within range, whether or not the UE is currently being served by that cell. Of particular interest for present purposes, these include a Physical Broadcast Channel PBCH as shown in FIG. 3. PBCH carries a so-called Master Information Block (MIB), which gives, to any UEs within range of the signal, basic information as described below. Primary and Secondary Synchronization Signals (PSS/SSS) are also broadcast to all devices within range; these carry a physical layer identity and physical layer cell identity group for identifying the cell.

User data as well as System Information Blocks (SIBs) are contained in a transport channel DL-SCH, carried on the Physical Downlink Shared Channel (PDSCH). There are various control channels on the downlink, which carry signalling for various purposes; in particular the Physical Downlink Control Channel, PDCCH, is used to carry, for example, scheduling information from a base station (called eNB in LTE) to individual UEs being served by that base station. The PDCCH is located in the first OFDM symbols of a slot.

Meanwhile, on the uplink, there is a Physical Random Access Channel PRACH which is used to gain initial access to the network, as explained in more detail below. User data and also some signalling data is carried on the Physical Uplink Shared Channel (PUSCH), and control channels include a Physical Uplink Control Channel, PUCCH, used to carry signalling from UEs including channel quality indication (CQI) reports and scheduling requests.

Since the above mentioned MIB and SIBs are important for the invention to be described, some further details will be given here.

The MIB includes some of the basic information which the UE needs to join the network, including system bandwidth, number of transmit antenna ports, and system frame number. Reading the MIB enables the UE to receive and decode the SIBs referred to earlier. With respect to SIBs, the term "receive" henceforth also implies "decode".

The SIBs differ in their information content and are numbered SIB1, SIB2, and so forth. SIB1 contains cell-access related parameters and information on the scheduling of other SIBs. Thus, SIB1 has to be received by a device before it can decode other SIBs such as SIB2. SIB2 contains information including random access channel RACH parameters, referred to below. Currently, SIBs are defined up to SIB14, although not all SIBs need to be received in order for a UE to access the network. For example, SIB10 and SIB11 relate to an Earthquake and Tsunami Warning System. SIB14 is intended for use with so-called Enhanced Access Barring, EAB, which has application particularly to MTC devices (see below).

For network access, generally SIB1 and SIB2 are the most important, in other words, at a minimum, a UE must normally decode SIB1 and SIB2, in that order, in order to communicate with the eNB. Recently, the present applicant proposed a reduced version of SIB2 called SIB2M, intended for MTC devices (see below), such that reception of SIB1 and SIB2M may suffice for MTC devices to join the network, although SIB2 will still be transmitted for other devices. In the special case of MTC devices subject to EAB, SIB14 is also important.

FIG. 4 illustrates the timings of MIB and SIBs in LTE. As can be seen from FIG. 4, the MIB is broadcast relatively frequently, being transmitted four times in each frame. The SIBs, which unlike MIB are transmitted on PDSCH, occur less frequency. The most essential SIB1 is repeated four times in every other frame, whilst SIB2 and further SIBs typically occur less frequently still. The SIBs are repeated to increase the chance of their being correctly received by a UE, since otherwise, the UE may have to wait an appreciable length of time for the next transmission. This can be a problem particularly for devices at a cell edge or in a coverage hole where reception is poor.

The Physical Random Access Channel PRACH, referred to in connection with FIG. 3, will now be explained since it is also important for the invention to be described. As already mentioned, UEs which have obtained timing synchronization with the network will be scheduled with uplink resources which are orthogonal to those assigned to other UEs. PRACH is used to carry the Random Access Channel (RACH) for accessing the network if the UE does not have any allocated uplink transmission resource. Thus, initiation by the UE of the transport channel RACH implies use of the corresponding physical channel PRACH, and henceforth the two terms RACH and PRACH will be used interchangeably to some extent.

Thus, RACH is provided to enable UEs to transmit signals in the uplink without having any dedicated resources available, such that more than one terminal can transmit in the same PRACH resources simultaneously. The term "Random Access" is used because (except in the case of contention-free RACH, described below) the identity of the UE (or UEs) using the resources at any given time is not known in advance by the network (incidentally, in this specification the terms "system" and "network" are used interchangeably). So-called "signatures" (see below) are employed by the UEs to allow the eNB to distinguish between different sources of transmission. Unlike the RACH in WCDMA for example, the LTE RACH is not designed to carry any user data, although the choice of signature can indicate other information such as the intended size of a subsequent message (see below).

Situations where the RACH process is used include:
Initial access from RRC_IDLE
RRC connection re-establishment
Handover
DL data arrival in RRC_CONNECTED (when non-synchronised)
UL data arrival in RRC_CONNECTED (when non-synchronised, or no SR resources are available)
Positioning (based on Timing Advance)

RACH can be used by the UEs in either of contention-based and contention-free modes.

In contention-based access, UEs select any signature at random, at the risk of "collision" at the eNB if two or more UEs accidentally select the same signature. Contention-free access avoids collision, by the eNB informing each UE which signature it may use (and thus implying that the UE is already connected to the network). Contention free RACH is only applicable for handover, DL data arrival and positioning.

Referring to FIGS. 5 and 6, the Physical Random Access Channel PRACH typically operates as follows:—

(i) The network, represented in FIGS. 5 and 6 by an eNB 20, informs each UE of the signature to be used for contention-free access, as indicated by "Message 0" in FIG. 5. Periodically, the eNB transmits the broadcast channel PBCH mentioned above, which can be received by all UEs within range (whether or not they are connected to the eNB). The PBCH (not shown in FIGS. 5 and 6) is transmitted once per frame, and is repeated four times (i.e. a complete set of repetitions spans four frames). The PBCH includes the MIB as already mentioned.

The UE 10 receives PBCH for the cell of interest. The information in the PBCH allows the UE to receive further SIBs, in particular SIB1 and SIB2 which are contained in PDSCH.

(ii) As already mentioned, PRACH related parameters are contained in SIB2, including:
time/frequency resources available for PRACH
signatures available for contention-based RACH (up to 64)
signatures corresponding to small and large message sizes.

The signatures each have a numerical index and the available signatures are indicated by use of a number, with all signatures identified by indices up to this number being available for contention-based access.

(iii) The next step differs depending on whether contention-based access or contention-free access is being attempted.

For contention-based access the UE selects, at random, a PRACH preamble signature according to those available for contention based access and the intended message size. The term "signature" is generally used to refer to characteristics of the particular PRACH preamble transmission. In LTE this corresponds to the preamble sequence. More generally, the signature may include the time domain resources and/or the frequency domain resources, which can include not only the location of such resources in time (symbol no.) and frequency (subcarrier) but also their extent in time and frequency (e.g., number of symbols, number of subcarriers). Henceforth the terms "preamble", "preamble sequence", "preamble signature" and "signature" will be used interchangeably, unless the context demands otherwise.

In the case of contention-free access, the UE employs the PRACH preamble signature which has previously been assigned to it via Message 0.

(iv) The UE 10 transmits the PRACH preamble (labelled "Message 1" in FIGS. 5 and 6, also labelled (1) in FIG. 6) on the uplink of the serving cell. The eNB 20 receives Message 1 and estimates the transmission timing of the UE. The PRACH preamble transmitted by a UE, having a certain signature, results in a distinctive waveform being received by the eNB, and the eNB makes a decision about which signature(s) the waveform corresponds to, by correlating it with all the possible transmitted signatures.

(v) The UE 10 monitors a specified downlink channel for a response from the network (in other words from the eNB). In response to the UE's transmission of Message 1, the UE 10 receives a Random Access Response or RAR ("Message 2" in FIGS. 5 and 6, also labelled (2) in FIG. 6) from the network. This contains an UL grant for transmission on PUSCH and a Timing Advance (TA) command for the UE to adjust its transmission timing. FIG. 6 shows the details of the RAR, showing the Timing Advance and UL Grant fields as well as (in the case of contention-based access) a Temporary Cell Radio Network Temporary Identifier (T-CRNTI) field, by which the RAR informs the UE of an identifier which it should use in its uplink communications following RACH. In contention-free access, the UE can be assumed already to have a C-RNTI.

(vi) For contention-based access, in response to receiving Message 2 from the network, the UE 10 transmits on PUSCH ("Message 3" in FIGS. 5 and 6, labelled (3) in FIG. 6) using the UL grant and TA information contained in Message 2. Message 3 includes a RRC Connection Request as shown in FIG. 6, and is the "subsequent message" whose intended size can be indicated by the choice of preamble signature as mentioned above.

In the case of contention-based access, there is the chance that the same preamble sequence may coincidentally be chosen by another UE also initiating random access. A contention resolution message (not shown) may be sent from eNB 20 in the event that the eNB 20 received the same preamble signature simultaneously from more than one UE, and more than one of these UEs transmitted Message 3. If the UE does not receive any response from the eNB, the UE selects a new signature and sends a new transmission in a RACH sub-frame after a random back-off time.

(vii) Further steps, shown in FIG. 6, include a RRC Connection Setup (labelled (4) in FIG. 6) by which the eNB responds to the RRC Connection Request, and a reply from the UE in the form of a RRC Connection Setup Complete message as labelled (5) in FIG. 6.

FIGS. 5 and 6 show the signalling sequence in a simplified form. There is also signalling between the eNB and MME 30 and the S-GW of FIG. 1. FIG. 7 is a more comprehensive signalling diagram for the case of contention-free access, including this higher-level signalling. As is apparent from FIGS. 5-7, the network access procedure in LTE is considerably involved and may occupy a significant amount of time, particularly if the initial steps are delayed by difficulty in receiving the SIBs referred to earlier, and/or if there is a need for contention resolution in contention-based access. Although it is possible to repeat transmission of SIBs to assist reception, this only extends the time taken to complete network access. Moreover, the power consumption involved may be significant for low-power devices.

Meanwhile, the advent of machine-to-machine communications (M2M) between e.g. smart meters in homes and an LTE network creates a large number of deployed devices (so-called Machine Type Communication or MTC devices) which must be low cost, low power, are generally deployed statically and have low-rate, possibly periodic data transmissions with potentially long gaps. This scenario is also referred to as Small Data Transmission.

It is therefore desirable to design signalling which is more efficient than existing LTE signalling by being targeted at the Small Data Transmission scenario, particularly but not exclusively with respect to MTC devices. In particular there is a need to support frequent transmission of small amounts of data efficiently with minimal network impact (e.g. signalling overhead, network and radio resources, and delay for resource reallocation). It would also be desirable to facilitate access to the network for devices (such as MTC devices) at a cell edge or coverage hole.

SUMMARY OF THE INVENTION

According to a first aspect of the present invention, there is provided a method of accessing a wireless communication network, comprising:
the network broadcasting system information specifying access parameters for gaining access to the network;
a device which needs access to the network deciding whether to use a stored configuration of the access parameters, and if so, transmitting an access request to the network on the basis of the stored configuration; and
the network deciding whether or not to accept the access request.

Here, "the network" may include one or more base stations which provide wireless access to a device within range. The device may be a terminal or subscriber station (also called UE in LTE), but more particularly, may be a Machine Type Communication, MTC device.

The system information (SI) may be in a plurality of parts. For example in LTE as mentioned earlier, SI comprises a MIB and a plurality of SIBs, the SIBs being transmitted in a different way from the MIB.

A "stored configuration of access parameters" means one or more parameter values held in a memory of the device, which would normally be acquired as part of SI prior to sending an access request. Preferably, the device will attempt to receive the currently-broadcast system information prior to deciding whether to use the stored configuration. Being acquired and stored at some earlier time, there is a risk that the stored configuration of access parameters will be out of data and thus invalid for use in the network. Thus, if the broadcast system information can be received, the device will use it, but if not, the device may attempt to access the network using the stored configuration.

The "access request" means a message transmitted by the device to the network in order to gain network access or more particularly to obtain a grant of UL resources for a data transmission. In the case of LTE, the access request includes a random access preamble, "Message 1" referred to in the introduction.

Generally, an access request based on the broadcast information may be expected to be more likely to be accepted. Here "receive the broadcast system information" includes receiving part of the SI. In LTE, for example, the device may be able to receive the MIB and SIB1, even if it cannot receive subsequent SIBs. However, to generate an access request based on the broadcast SI would normally require receiving all of MIB, SIB1 and SIB 2 (or SIB2M).

Thus, in embodiments of the present invention the device is able to transmit an access request without necessarily having read all the SI normally required to make such a request.

This may be a particular advantage in the context of so-called Small Data Transmission, where devices may have a need to access the network (perhaps urgently) but only a small amount of data to send. As one example applied to LTE, the access request might follow reception by the device of MIB and SIB1, but not necessarily SIB2 (or SIB2M).

As an alternative to use of the stored configuration, the device may use the access parameters contained in the broadcast SI, which may be either conventional SI (for example MIB, SIB1 and SIB2 in the case of LTE) or modified SI suitable for MTC devices (MIB, SIB1 and SIB2M for example).

The network receives the access request and decides whether or not to accept the access request on the basis of information available to it. The network may be more likely to accept the access request if is aware of the use of the stored configuration. Thus, preferably, the device indicates use of the stored configuration. In other words, the device notifies the network that the access request is based on the stored configuration, preferably as part of the access request itself. Such a notification need not be explicit but may for example be implicit in the manner in which the access request is transmitted. The indication may be made in various ways, including a flag to denote use of a stored configuration by one value, or use of read SI by another value; or by positive indication of use of read SI implying, in the absence of the positive indication, that a stored configuration used has been used. This indication may alternatively be made by separate signalling, including possibly signalling outside the wireless communication network.

Moreover, preferably, the device further indicates a failure to receive at least part of the system information, again preferably by means of the access request itself. That is, the access request may contain or imply a combination of indications. The indication of failure to receive SI may imply to the network that the device is located in a coverage hole.

In the event that the device holds a plurality of stored configurations of the access parameters, the method may further comprise the device selecting from among the plurality of stored configurations, and indicating the selected stored configuration. Again the indication may be implicit in the characteristics of the access request. Here, the selecting may be guided or instructed by the network (for example by signalling during wireless communication prior to the access attempt).

In one embodiment, the access request is a random access request including, selected by the device, any one or more of:
  a preamble from among a set of random access preambles; and/or
  a transmission timing from among a plurality of possible timings; and/or
  a transmission frequency from among a plurality of possible frequencies; and/or
  a duration in time from a plurality of possible durations; and/or
  an extent in frequency from among a plurality of possible frequency ranges; and/or
  a repetition sequence of signals such as preambles in the time and/or frequency domain from among a plurality of repetition sequences;
  the device indicating use of the stored configuration and/or a failure to read at least part of the system information by its selection(s).

Normally, selection of a preamble from among a set of preambles would imply contention-based access as understood in LTE for example. However, this is not necessarily the case; it would be possible for a device to be configured with a plurality of preambles for contention-free access.

Although the number of available preambles is limited in a wireless communication system such as LTE, it will be apparent that by selecting from among of the above variables, a potentially large number of combinations is available for indicating further information (such as the stored configuration or failure to read SI).

The network may respond to a random access request with a random access response, and may repeat transmission of the random access response if the device indicates a failure to read system information.

Preferably, the system information includes an indication of whether an access request based on a stored configuration will, or will not, be accepted by the network. As already mentioned the SI may be broadcast in a plurality of parts, in which case it is preferable to include such an indication in an earlier part of SI (such as SIB1 in LTE), increasing the probability that the device can receive it.

If some system information received by a device indicates that an access request based on a stored configuration will not be accepted by the network, the device attempts to receive a transmission of further system information. Thus, in LTE for example, a device informed from reading SIB1 that a stored configuration is not acceptable, must wait until it has correctly read SIB2 (or SIB2M) before sending the access request.

Preferably the network repeatedly transmits the further system information and the device repeats attempts to receive the further system information until it is successfully received (decoded and read).

For a wireless communication network in which wireless communication takes place in time units of frames, each frame divided into a plurality of subframes, the network decides whether or not to accept the access request based on one or more of:
  whether or not an indication of use of a stored configuration has been received;
  whether the access parameters used for the access request are valid;
  the subframe in which the access request was received; and
  whether or not the access request contains a specific signature assigned to the device.

In any method as defined above, the device may obtain the stored configuration from any of:
  factory setting of the device;
  an application layer setting;
  system information received during an earlier access to the network; or
  network specifications.

In one embodiment, a method as defined above is applied to an LTE-based wireless communication system, the access request including a RA preamble transmission of the device (corresponding to "Message 1" in FIG. 5).

In one embodiment, the device is a Machine Type Communication, MTC device. However, the present invention is also applicable to other classes of UEs particularly those at a cell edge or in a coverage hole.

Embodiments of the present invention may be applied both to a network broadcasting conventional SI (MIB, SIB1, SIB2 etc), and to networks which broadcast modified SI (such as SIB2M intended for MTC devices).

According to a second aspect of the present invention, there is provided a wireless communication system, comprising:
a base station arranged to broadcast system information specifying access parameters for gaining access to the system; and
a device arranged to determine a need for access to the system, to decide whether to use a stored configuration of the access parameters for an access request, and if so, to transmit the access request to the base station on the basis of the stored configuration; wherein
the base station is arranged to decide whether or not to accept the access request.

According to a third aspect of the present invention, there is provided a base station for use in a wireless communication network, the base station arranged to:
broadcast system information specifying access parameters for gaining access to the network;
receive an access request from a device wishing to access the network; and
decide whether or not to accept the access request taking into account whether or not a stored configuration of the access parameters has been used for the access request.

According to a fourth aspect of the present invention, there is provided a device for use as a terminal in a wireless communication network, the device arranged to:
receive at least part of broadcast system information specifying access parameters for gaining access to the network;
determine a need for access to the system, decide whether to use a stored configuration of the access parameters for an access request, and if so, to transmit the access request to the network on the basis of the stored configuration.

The above second to fourth aspects may share any of the optional features recited above with respect to the method of the invention. In particular, the base station may receive from the device an indication of the use of the stored configuration for the access request, and the device may be further arranged to provide such an indication either as part of its access request, or separately. Thus, by sending an access request based on a stored configuration the device may also (implicitly, by characteristics of the access request) provide an indication that a stored configuration of access parameters has been employed.

According to a further aspect of the present invention there are provided computer-readable instructions which, when executed by a processor of a transceiver device in a wireless communication system, cause the device to provide the base station or the terminal as defined above.

Thus, embodiments of the present invention involve a new access method of devices to a network which allows the transmission of small data packets without the need to read all the System Information normally required to make an initial network access. This access method may be particularly beneficial for M2M communication with MTC devices. The behaviour goes beyond existing methods specifically including the ability to notify the network that initial access is occurring from a device that was either specifically allowed to use a stored access configuration or is accessing the cell using SI (or modified SI) being broadcast by the cell.

Embodiments of the present invention enable the configuration of RACH for initial access without the normal broadcast signalling required for pre-configuration of a modified method for initial access of a device to a network, and target low-cost M2M applications that usually require transmission of infrequent small amounts of data. In particular, embodiments of the present invention are suitable for use in the case of infrequent machine small packet transmissions from a higher layer perspective and the configuration of infrequent small data packet UL transmissions.

In embodiments, the network is informed of the method being used by the device to access the network and can either reject this access or accept it depending on whether the access was from a stored configuration or read from System Information reading (e.g. SIB2M).

In general, and unless there is a clear intention to the contrary, features described with respect to one aspect of the invention may be applied equally and in any combination to any other aspect, even if such a combination is not explicitly mentioned or described herein.

As is evident from the foregoing, the present invention involves signal transmissions between a terminal and a base station in a wireless communication system. The "terminal" referred to here, also referred to as a subscriber station or UE, may take any form suitable for transmitting and receiving such signals. For the purpose of visualising the invention, it may be convenient to imagine the terminal as a mobile handset but no limitation whatsoever is to be implied from this. In preferred embodiments of the present invention, the base station will typically take the form proposed for implementation in the 3GPP LTE and 3GPP LTE-A groups of standards, and may therefore be described as an eNB (eNB) (which term also embraces Home eNB or HeNB) as appropriate in different situations. However, subject to the functional requirements of the invention, the base station may take any other form suitable for transmitting and receiving signals from terminals.

BRIEF DESCRIPTION OF THE DRAWINGS

Reference is made, by way of example only, to the accompanying drawings in which.

DETAILED DESCRIPTION

Figure 1:
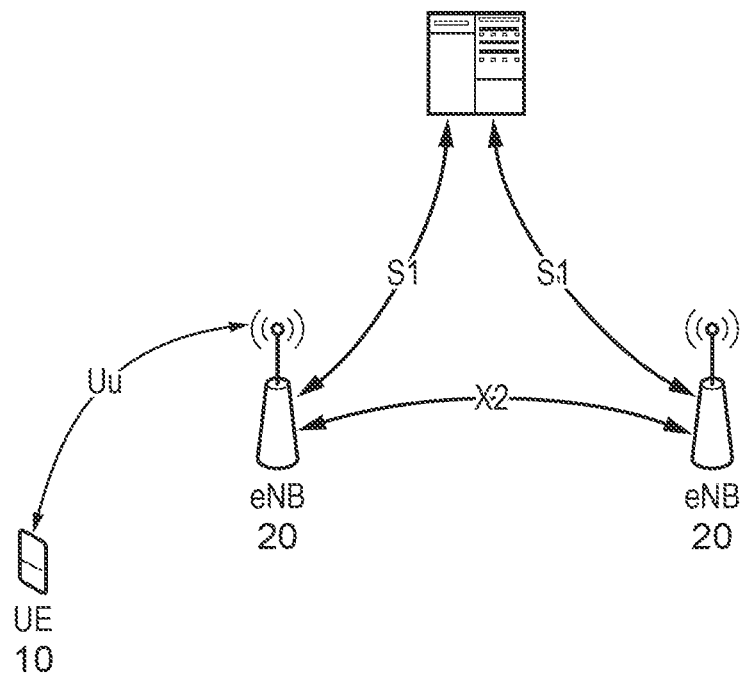
FIG. 1 shows the basic system architecture in a LTE-based wireless communication system.
Figure 2:
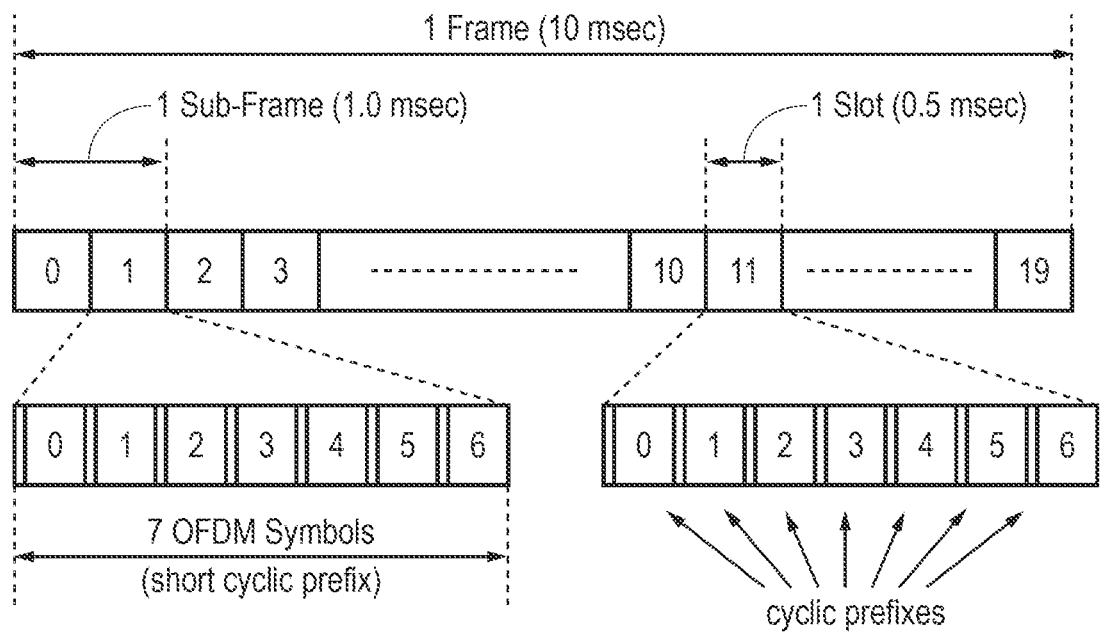
FIG. 2 shows the relationship between frames, subframes and slots in LTE.
Figure 3:
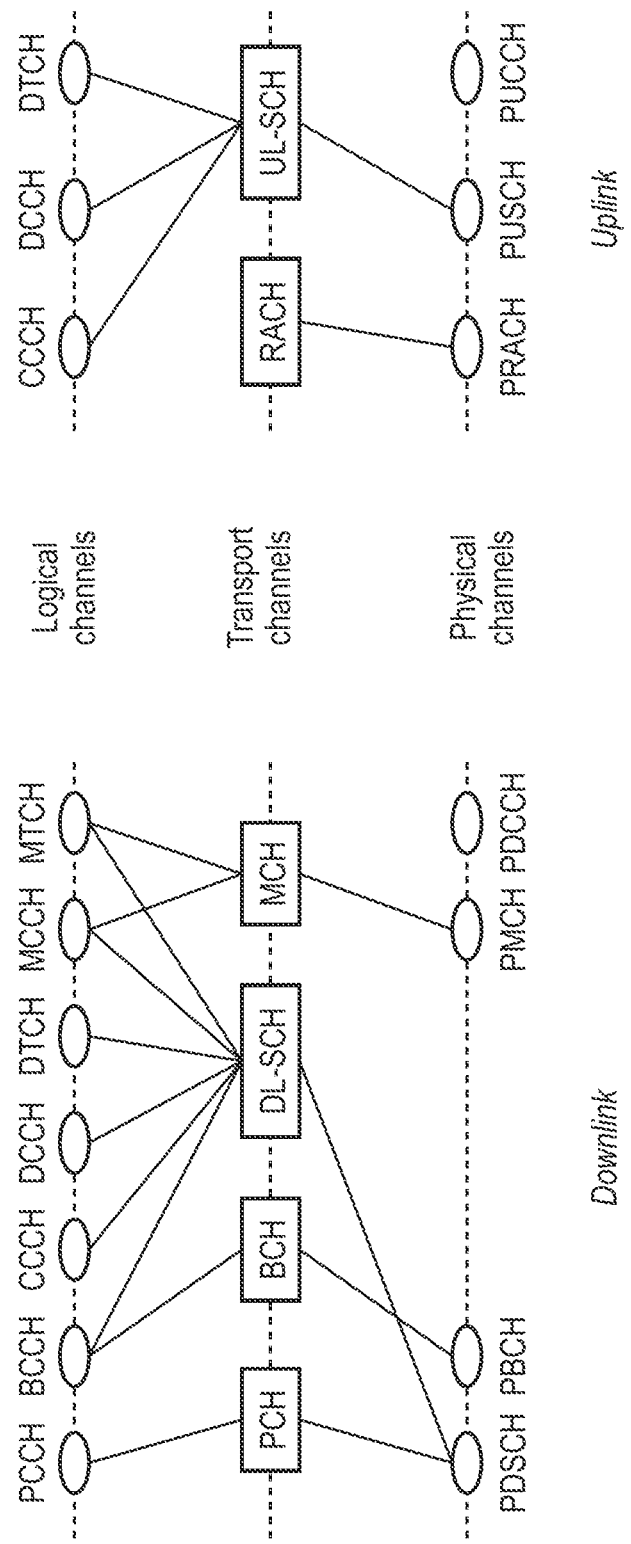
FIG. 3 shows relationships between various uplink channels defined in LTE.
Figure 4:
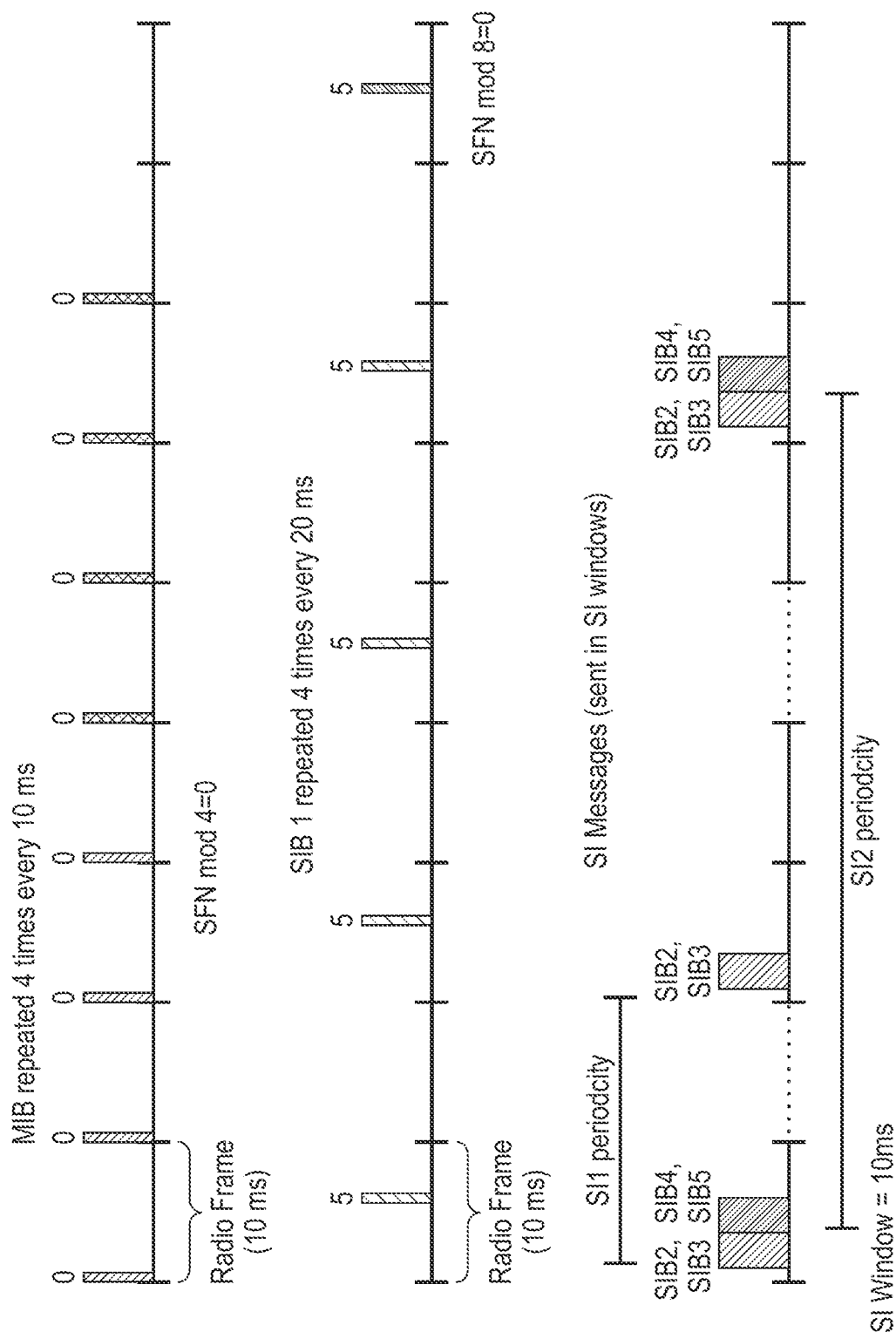
FIG. 4 shows timings of transmission of system information (SI) in LTE.
Figure 5:
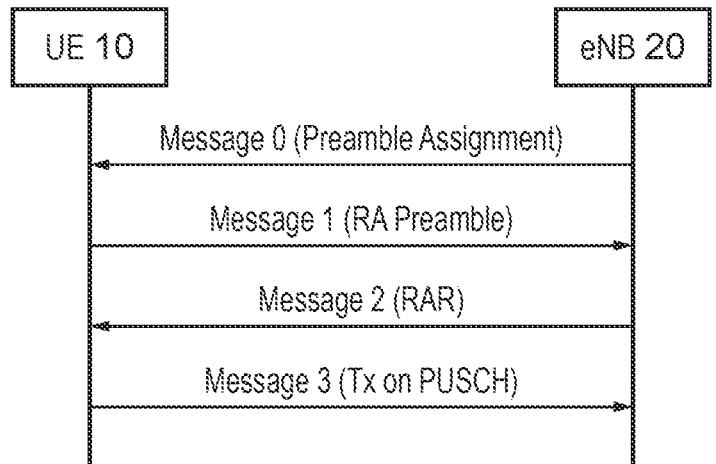
FIG. 5 shows in simplified form a random access (RACH) procedure in LTE.
Figure 6:
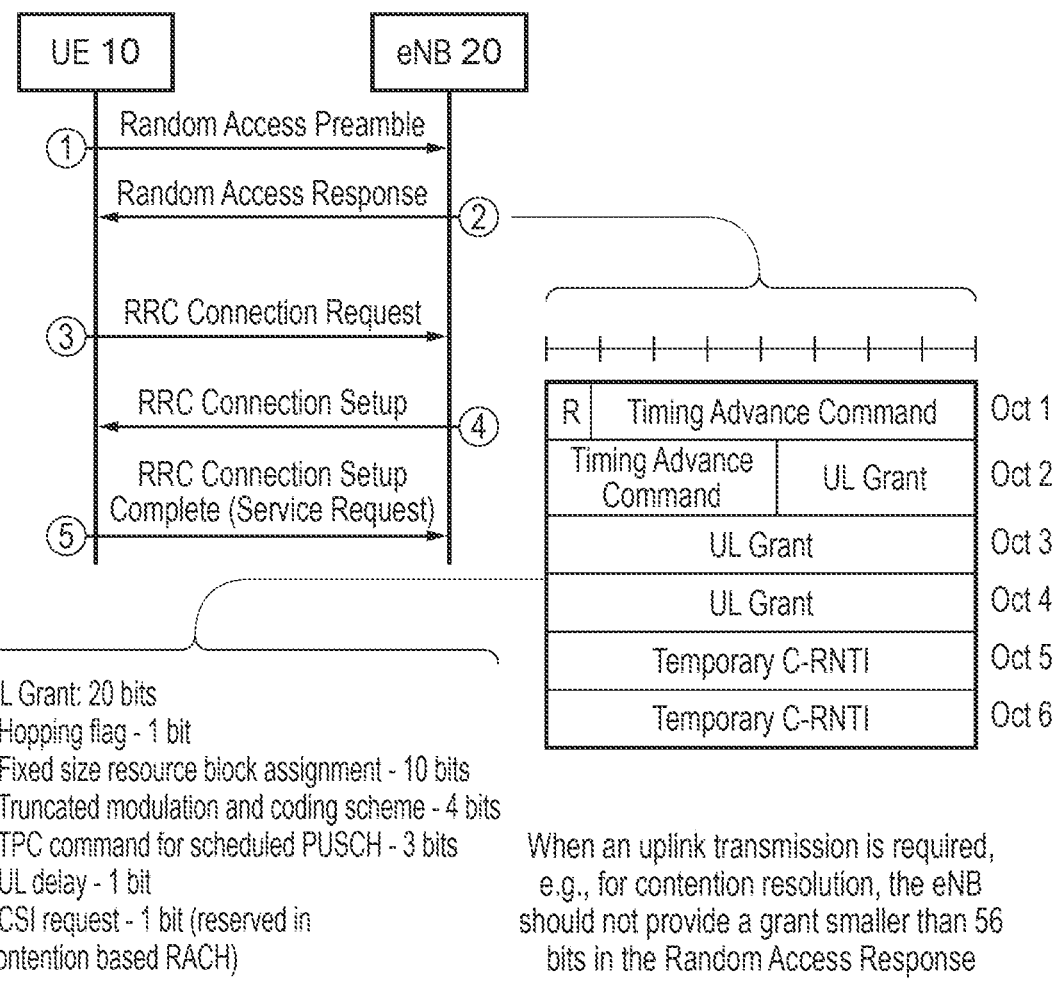
FIG. 6 shows the RACH procedure in more detail, including the contents of a random access response (RAR)

The following description will refer to "UEs" and "MTC devices" interchangeably. For present purposes, MTC devices can be regarded as one class of UEs, to which the present invention is particularly relevant, although the present invention is applicable to other classes of UEs.

For the transmission of data to and from MTC devices that are located in low signal condition areas, one solution being investigated is the use of repetition of key system information, being broadcast by an eNB to allow a MTC device to receive this information with a lower SNR than normal, potentially going −15 dB below cell edge SNR levels. Here, "key system information" means all the SI needed by a set of devices to access the network. For example if devices are not moving, then SIBs related to measurements for coping with mobility are not required for these devices to access the network. As already mentioned, however, this will lead to the situation where initial access by the MTC device can be delayed significantly due to the time taken to read system information from a cell before attempting to access that cell.

A principle in embodiments of the present invention is to reduce or avoid this delay by allowing the device to use stored access parameters in certain circumstances. The use of previously stored access parameters will result in the UE being allowed to transmit using parameters which are potentially not currently allowed by a cell. Desirably, some mechanism should exist for the UE to know whether it can use the stored access parameters or not, and to indicate to the network that a stored access parameters are being used.

Some methods for using RACH for initial data access have been described before, including using Message 1 as an indication of the amount of data that the UE has available for transmission stored in it's uplink data buffer. One possible extension of this is that the initial access using a stored PRACH configuration is indicated to the eNB. Thus, the eNB would know that the access to the eNB is being performed by a MTC device that has either been allocated a certain stored RACH access parameters as a result of a previous RRC active mode connection or by having read the valid parameters from system information (typically in SIB14) or from SIB2M.

As explained in U.S. provisional patent application Ser. No. 13/02,455 assigned to the present applicant, it is possible to indicate changes in SIB1, SIB2 and/or SIB2M (a modified SIB2 for MTC devices) by use of flag bits that are stored either in legacy PBCH or in a newly defined MTC PBCH. This allows a device to know whether the SI has changed (and thus by implication whether stored access parameters corresponding to any of SIB1, SIB2/SIB2M remain valid).

In embodiments of the present invention, the device is configured to read system information contained either in SIB2M, and/or SIB1 and/or SIB14 and then based on an indicator bit or bits stored in SIB2M, SIB1 or SIB14 can either use a previously stored configuration or re-read SIB2 or SIB2M to obtain a valid configuration.

The main benefit of this scheme is that the indication of the configuration that the device used is signalled quickly to the network so the network (more particularly the eNB) has full knowledge of the method being used by the device to access the network and can either reject this access or accept it depending on whether the access was from a stored configuration or read from System Information reading (e.g. SIB2M).

Some embodiments will now be described in more detail. In general, unless otherwise indicated, the embodiments described below are based on LTE, where the network comprises multiple eNBs and MTC devices are allowed to attach to the network.

The RACH procedure in LTE was explained in the introduction. Whilst suited to UEs of human users (also called H2H for human-to-human, as opposed to M2M), where the UEs tend to be mobile and data traffic may be high, the procedure is less suited for MTC devices and Small Data Transmission. Conceptually MTC traffic is different as devices are generally static in one location and transmit low data volumes. Some use of this can be made to improve the mechanism for an MTC device to connect to the network to either send or receive data.

The trigger data for an MTC device to start the connection procedure to a network from IDLE mode (i.e. not connected) are defined as either:

MO: Mobile Orientated data, where the MTC device itself requires to either read data from the network or send data to the network and can start a RACH procedure, or MT: Mobile Terminated data, where the MTC device is instructed by the network to initiate RACH procedure to receive incoming data.

In embodiments, a modified RACH procedure can be triggered by either MO or MT data.

After reading MIB information, conventionally the UE will proceed to read SIB2 information which will contain, amongst other information, the RACH configuration to be used in the RACH procedure.

RACH configuration usually has to be read every time the device accesses the network due to the likelihood of changes in MTC RACH configuration (considering different RACH resources allocated, dependent on different coverage deficit experienced by the device). This assumption holds even if the device is mainly located in the same physical location, since the propagation channel could vary in time due to different factors.

The proposed scheme preferably involves reading SIB1 which as already mentioned, includes pointers to other SIBs so that they may be read. Then, preferably using a flag (or other indicator) stored in SIB1, to either use a previously stored configuration or re-read SIB2 to obtain a valid configuration.

The process involves storing the RACH configuration from radio resource configuration (radioResourceConfigCommon) from previous reception of SIB2 or SIB14, and re-using this if allowed by signalling in eNB or in the absence of any alternative.

The scheme then preferably indicates the use of a previously stored configuration using data that can be sent together with the initial RACH access ("Message 1"). This can be information indicating that the stored configuration was obtained from either a previous configuration which was made during an active RRC connection or obtained from modified System Information broadcast by the cell, e.g. a new SIB such as SIB2M (a SIB specifically for machine type communications access).

First Embodiment

Figure 8:
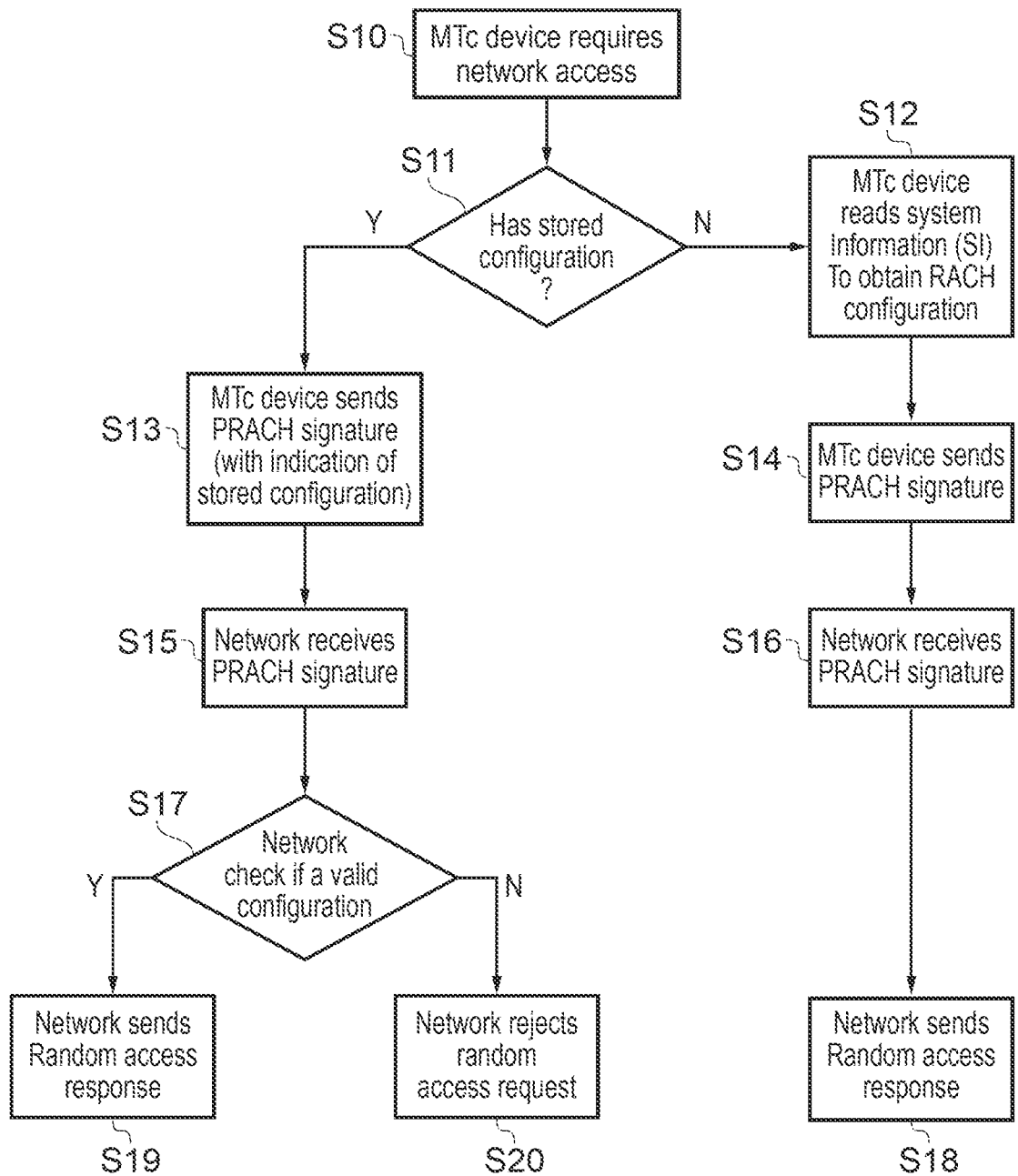
FIG. 8 is a first flowchart of steps in embodiments of the present invention.

For a first embodiment, FIG. 8 indicates a possible flow sequence of events where the indicator for the stored configuration can be sent as part of Message 1 (PRACH signature transmission).

To begin with, it is assumed that a MTC device has no current access to the network, but may have gained access at some time(s) in the past, and may have stored in its memory some access parameters applicable at that time. For example the most recent access parameters may be held in memory, over-writing any previous stored configuration.

In step S10, the MTC device determines a need for gaining network access, typically due to having some data ready to transmit to the network.

In step S11, the device checks whether it has a stored configuration which might be used for an access request. This step might be conditional on receiving sufficient SI (such as MIB and SIB1) to inform the device that a stored configuration is allowed by the network.

If there is no stored configuration (S11, N) (or if use of a stored configuration is not allowed), the flow proceeds to S12 where the device is required to read (further) SI in order to obtain the RACH configuration. For example, even if the device has already received MIB and SIB1, it must now receive SIB2 to obtain this information. SIB2M, if it is being transmitted for use of MTC devices, may be received instead.

Proceeding further with this case (which corresponds to the conventional procedure), the device then sends a PRACH signature in accordance with the received RACH configuration (S14). Assuming the device has no existing connection with the network, this would be by way of contention-based access.

Figure 7:
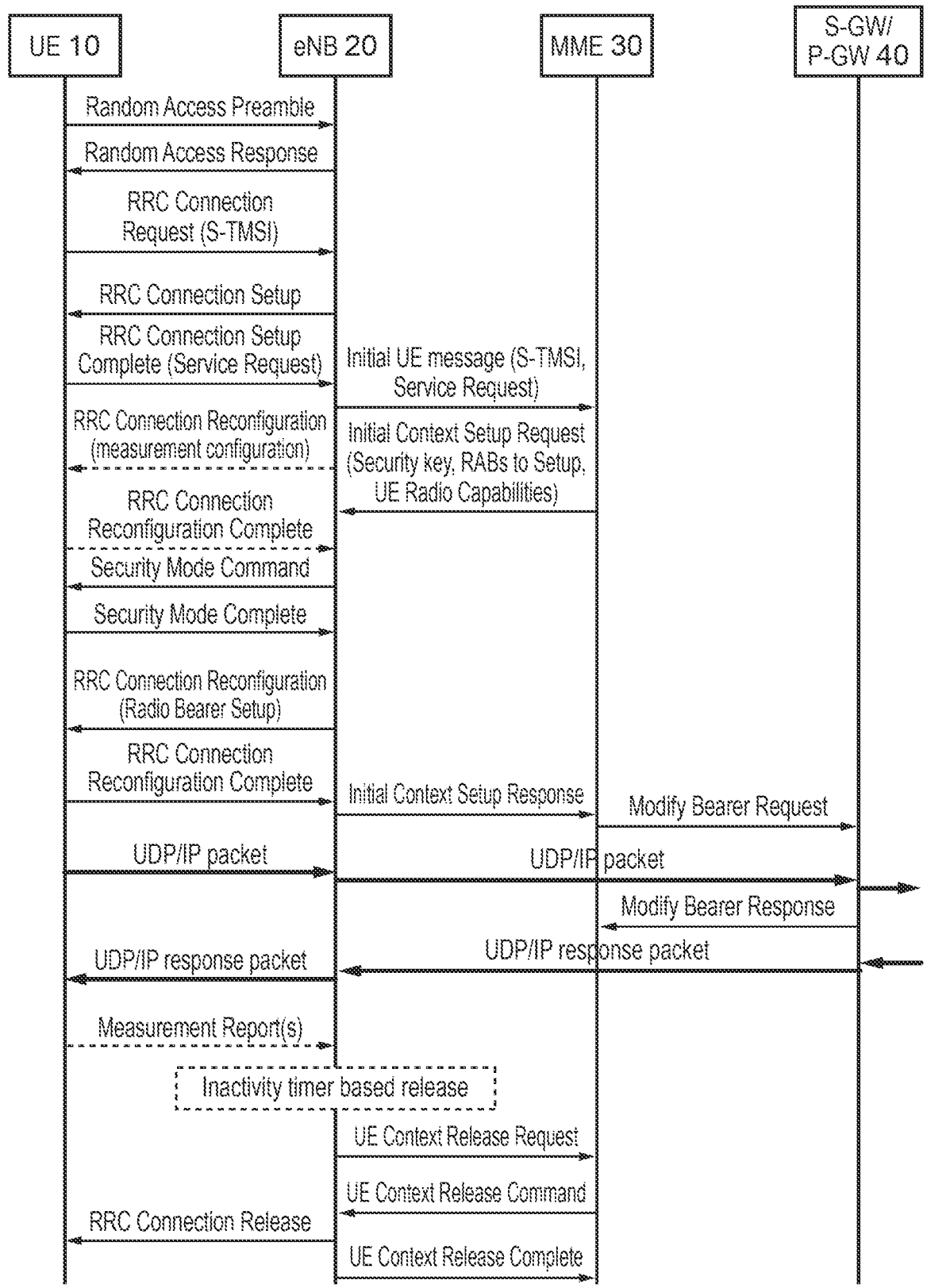
FIG. 7 is a detailed signalling diagram showing network entry and subsequent procedures in LTE.

The network receives the PRACH signature (S16) and sends a RAR (S18), followed by contention resolution if necessary. This would be followed by the remaining steps of the conventional signalling sequence shown in FIG. 7, including the RRC Connection Request, RRC Connection Setup and so forth.

Meanwhile, if in step S11 the device does have a stored configuration (and preferably, knows that use of a stored configuration is allowed), the flow follows the branch indicated by S11, Y according to which the device sends a PRACH signature based on the stored configuration or in other words, using values of access parameters contained in the stored configuration. There may be more than one stored configuration as explained later. In doing so, preferably, the device indicates use of the stored configuration in some way; usually this will be achieved by implicit signalling as described below.

Then, in S15 the network receives the PRACH signature and checks whether it has a valid configuration. The configuration may include for example the choice of signature, time and/or frequency used to transmit it, and so forth.

If the configuration is valid (S17, Y) the network sends the RAR. If not (S17, N) it rejects the access request. That is, the eNB which receives the request may simply ignore it, or may send a signal to notify the device of rejection of the request. If its request is ignored (or positively rejected) the device may try again, preferably after a renewed attempt to read SI.

One feature of this embodiment is the use of an UL indication in Message 1 that a stored configuration for PRACH has been used for the 1st PRACH attempt by the MTC device.

This indication can be by the choice of a pre-defined specific preamble for Message 1 (signature and/or duration) or frequency/time domain sequence of preambles (as preambles are repeated). Another possibility is that the RACH preamble is transmitted by the device so as to be received at a pre-defined point in time (with known pre-defined defined timing point that allows the network to distinguish between different types of access (either with the stored configuration or without).

The number of preamble signatures used for this method can be one or any number of preamble signatures.

Another way that can be used for the indication of the choice of either SIB2/SIB2M parameters or a stored radio resource configuration can be additional signaling bits in the UL message sent by a device to the network.

As indicated by the right-hand branch of FIG. 8 (S12, S14, S16, S18), an MTC UE could also have to read SIB2 if there is no other option available for it.

Second Embodiment

The principle of the first embodiment can be extended to the case where the device is located in a coverage hole, making it difficult to read SI even after repetition. The second embodiment allows the device to indicate this fact to the network.

Figure 9:
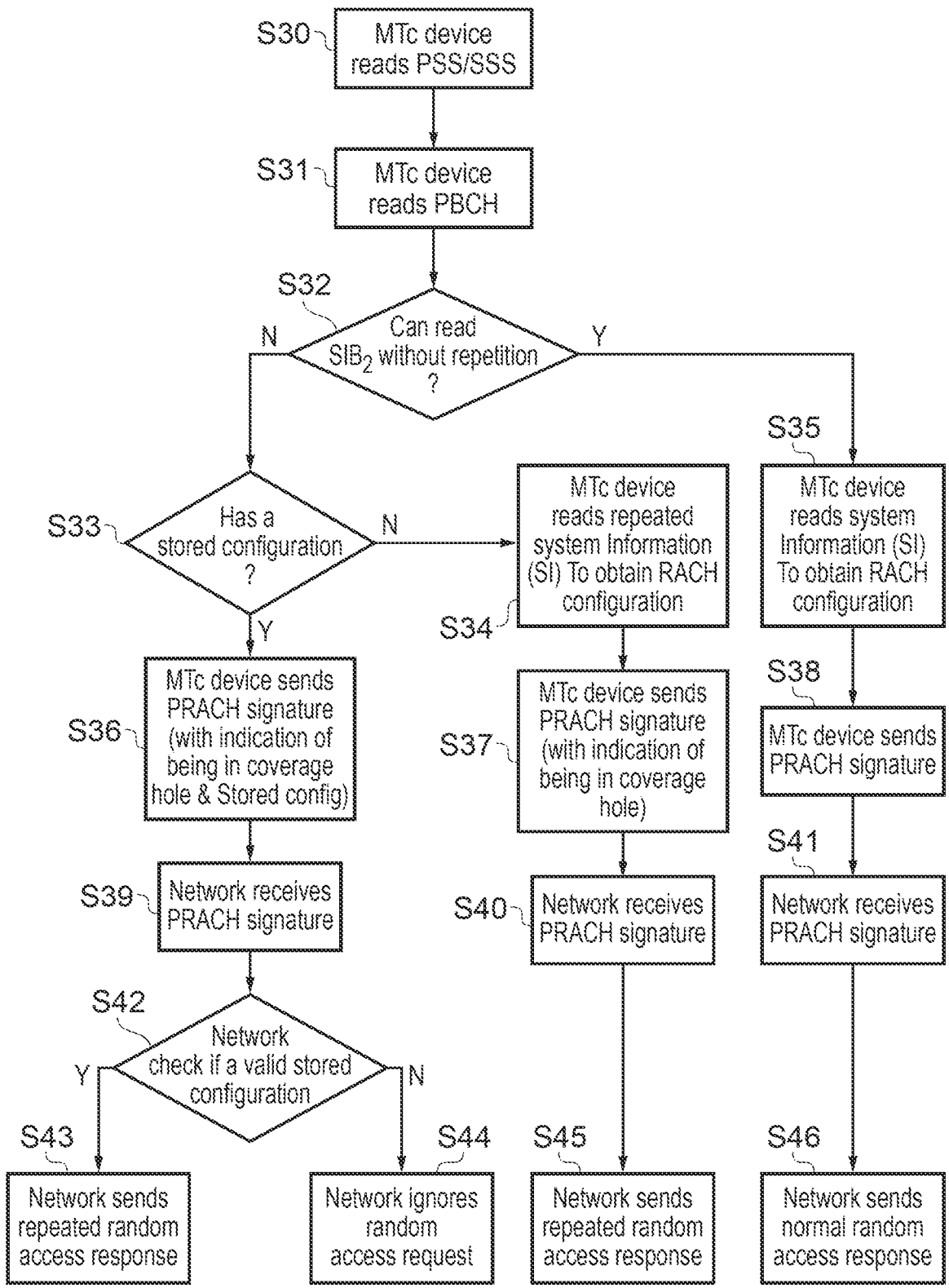
FIG. 9 is a second flowchart of steps in embodiments of the present invention.
Figure 10:
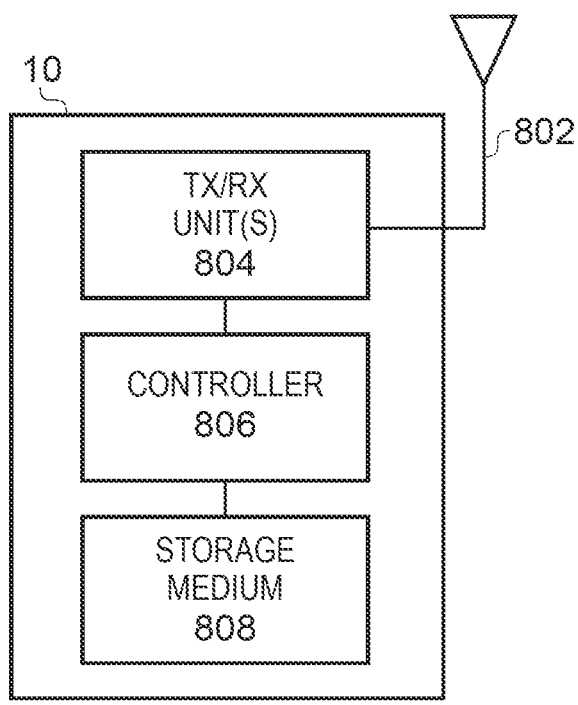
FIG. 10 is a schematic diagram of a UE to which the present invention may be applied.
Figure 11:
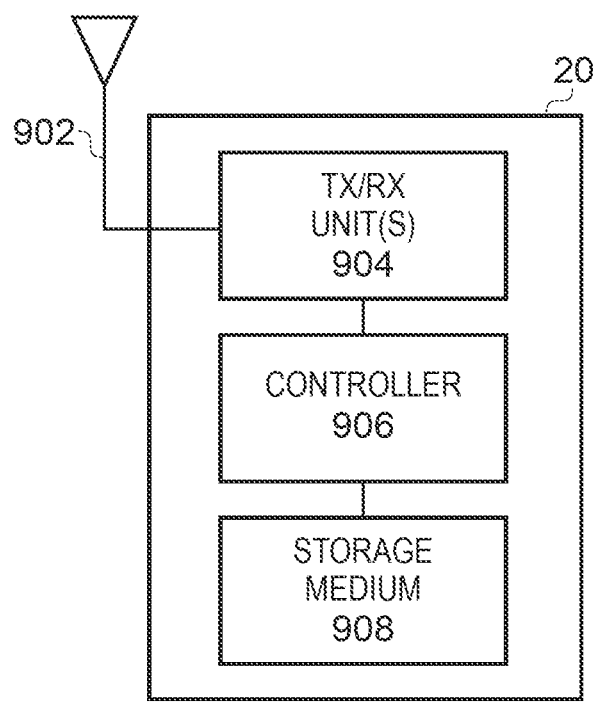
FIG. 11 is a schematic diagram of an eNB to which the present invention may be applied.

In FIG. 9, a more detailed procedure is shown in comparison with FIG. 8, where the UE can either indicate that it has used a stored configuration and/or that the SI was read using the repeated broadcasts of the SI. It is assumed that the device has a need to access the network.

As would also be present in the first embodiment, an initial step S30 is shown of the MTC device receiving a broadcast of PSS/SSS identifying the cell. In S31 the device reads PBCH, which as already mentioned includes the MIB.

The device then attempts to read SIB1 and SIB2. In S32, it is determined whether or not SIB2 can be read without repetition, in other words without having to receive more than one transmission of SIB2.

If SIB2 can be read without repetition, the device can proceed with the conventional RACH procedure as indicated in S35, S38 S41 and S46, that is, by using the broadcast SI without having to resort to a stored configuration. Here, the broadcast SI could include SIB2M in place of SIB2, if available.

If SIB2 cannot be read without repetition (or cannot be read at all) (S32, N) the flow process to S33 where the device checks whether it has a stored configuration to use for an access request. If it does (S33, Y) it proceeds to send a PRACH signature based on the stored configuration in S36. However, in this case the characteristics of the PRACH signature transmission (preamble, timing, frequency, etc) indicates not only the use of a stored configuration, but also the fact that the device was unable to read SIB2 without repetition. As indicated in the Figure, this may be equivalent to indicating that the device is in a coverage hole.

The flow in this case proceeds to the network receiving the PRACH signature (S39) and deciding whether the stored configuration is valid or not. For example if the PRACH signature transmission reflects an out-of-date configuration, the network may reject the access request, in which case (S42, N) the network ignores the access request (S44). Conversely if the stored configuration is valid, this will lead to an acceptable access request to which the network responds with a RAR. Unlike the conventional procedure, this may be a repeated RAR as indicated in S43, to deal with the indication that the device is in a coverage hole and will therefore find it difficult to receive the RAR.

On the other hand, if the device has either no stored configuration at all, or if it knows from SI read so far that the stored configuration would not be allowed (S33, N) this means that the device has to wait for one or more repetitions in order to successfully read the required SI (in particular SIB2). The flow thus proceeds to S34 where the device reads SI a sufficient number of times to obtain the RACH configuration, and then (S37) sends a PRACH signature. In this choice, the characteristics of the PRACH signature transmission indicate to the network that the device is in a coverage hole, similarly as in S36, but there is no need to indicate use of a stored configuration. If desired, a positive indication could be made to the effect that a RACH configuration based on read SI was being employed. In step S40, the network receives the PRACH signature and responds with a RAR. As in the case of S43, this may be a repeated RAR to assist reception by the device in a coverage hole.

To summarise the above, in this embodiment the device will try and read normal SI but if this fails then it will use the stored configuration and signal the use of the stored configuration to the network, which can decide, on the basis that the stored configuration is no longer valid and should be renewed, that it can ignore this access attempt. Again, a signal rejecting the access request could be transmitted if desired.

If the network knows that the access attempt comes from a stored configuration, the response may be different than (or interpreted differently to) a normal RACH response, since the random access response may already include a confirmation of UE RNTI and immediate access to UL radio resources for the sending of a small data packet in the first UL transmission from the device. Thus for example the device may be assumed by the device to be for immediate data transmission. This could reduce the amount of messaging that is sent after initial access by removing the need for the RRC configuration setup messages shown in FIG. 7 (e.g. RRC Connection Reconfiguration (measurement configuration) and RRC Connection Reconfiguration (Radio Bearer Setup)).

If a valid stored configuration is not present, then the device will read the SI that is being (typically being repeated) broadcast for a device in a coverage hole. This can also be indicated in the UL message, as the response may have to be sent with higher power/and or repetitions to reach the device in the coverage hole.

Third Embodiment

A third embodiment is similar to the first and second embodiments, except that an MTC UE may also use the same random access configuration as non-MTC devices. In other words the MTC devices may be required to employ the conventional procedure for reading SI, in place of the modified procedure provided by the present invention. It could be determined on the basis of a flag (e.g. in MIB or SIB1) whether the UE must receive SIB2 or not. In the case that the UE uses the PRACH resources indicated in SIB2, following the conventional procedure, no additional bit(s) or special signature is needed to be used.

Such a flag would of course be received by all devices in the cell, not only MTC devices. This flag might not be needed for UEs located in regular coverage areas; it may be used by any device that requires fast access to the radio resources, i.e. to send one or a small number of packets with reduced control signalling overhead.

In variations of these embodiments the PRACH resources for MTC UEs may be restricted in the time domain (e.g. only available in certain subframes). In a further variation, an MTC UE is configured with a dedicated preamble/signature and uses the contention free RACH procedure (in the designated subframes). Use of designated subframes in this way would allow re-assignment of the limited number of available preambles, such that use of the present invention would be available only in certain subframes with the conventional procedure in force during other subframes.

For contention-based access a set of preambles would be assigned in common for the MTC devices, some of which preambles could be used to indicate use of a stored configuration, and others possibly indicating a coverage hole. Whilst for contention-free access, each MTC device would be assigned a small number of preambles, such as one for each of a plurality of stored configurations plus a preamble for conventional random access.

If the network receives indication of stored configuration access but requires that a UE has to re-read broadcast parameters and discard the stored configuration, then another signal can tell the UE to re-read SI (e.g. Message 3 or another message sent by the network to the UE).

Use of a timer, or counting a number of access attempts, can prevent the UE from accessing the network with a stored configuration so it has to re-read access parameters from the SIB.

Stored configuration could come from the application layer (OAM, oneM2M configuration):
Factory setting
Application layer setting (e.g. from an app)
Read from SI (at some earlier point in time)
Specifications
There could be multiple stored configurations available for use in the UE.

A method needs to be defined where the UE selects which stored configuration to use, perhaps defined as a priority list.

Stored configuration priority could be controlled by a DL flag (part of PBCH or SIB). For example, if the eNB wishes to notify the UE not to use any default configuration (or a specific default configuration), then the DL indication would control this in the UE.

Therefore the UL indication could be multi-level, e.g. if a previously read stored configuration expires then the UE could use the default (specification/factory setting) configuration and indicate this with a different UL indicator to the eNB.

As indicated above with respect to steps S34, S37, S40, S45 of FIG. 9, an MTC device may indicate being in a coverage hole with an UL indication, which can be sent as part of the PRACH procedure. This can be used for the basestation to repeat DL transmission to reach the device in the poor coverage area.

This stored configuration mode of operation could also be an option for handsets intended for operation in coverage deficit areas, not just MTC devices, assuming it is compliant with the new UE category that might be defined for this category of devices.

Various modifications are possible within the scope of the invention.

In the above description, an MTC device indicated use of a stored configuration by the characteristics of a PRACH preamble transmission. However, other UL signalling could be used for this purpose, including signalling outside of the LTE network (for example via Wi-Fi or a wired cable connection if available). An indication is used to indicate that the device is in poor coverage area, and therefore needs to receive SI in a dedicated way.

Notification of use of a stored configuration would allow the network to send a massively repeated Message 2 (RAR) in a way which is specifically designed for operation of devices in coverage deficit areas, by allowing the device to increase the probability of decoding Message 2 successfully.

Thus, embodiments of the present invention can involve repetition of RAR in addition to repetition of SIBs.

The UL indication could be a short "ping" type of message, where the use of a certain preconfigured RACH access (in other words an access request having certain preamble/timing/frequency and/or repetition characteristics) is used by the device to indicate a "can you hear me?" message, to which the networks can acknowledge with a "yes I can" message. This would allow the device to return to sleep. If the device does not hear the response, then it would typically repeat the UL message until it gets a response. If no response was available, the device would raise a user alarm (e.g. if the device also is connected to the internet by cable or WiFi connection).

FIG. 8 is a block diagram illustrating an example of a UE 10 to which the present invention may be applied. The UE 10 may include any type of device which may be used in a wireless communication system described above and may include cellular (or cell) phones (including smartphones), personal digital assistants (PDAs) with mobile communication capabilities, laptops or computer systems with mobile communication components, and/or any device that is operable to communicate wirelessly. The UE 10 includes transmitter/receiver unit(s) 804 connected to at least one antenna 802 (together defining a communication unit) and a controller 806 having access to memory in the form of a storage medium 808. The controller 806 may be, for example, Microprocessor, digital signal processor (DSP), application-specific integrated circuit (ASIC), field-programmable gate array (FPGA), or other logic circuitry programmed or otherwise configured to perform the various functions described above, such as determining whether or not to employ a stored configuration of access parameters to construct an access request. For example, the various functions described above may be embodied in the form of a computer program stored in the storage medium 808 and executed by the controller 806. The transmission/reception unit 804 is arranged, under control of the controller 806, to transmit an access request, receive signals from an eNB such as SI or RAR, and so forth as discussed previously.

FIG. 9 is a block diagram illustrating an example of an eNB 20 to which the present invention may be applied. The base station 20 includes transmitter/receiver unit(s) 904 connected to at least one antenna 902 (together defining a communication unit) and a controller 906. The controller may be, for example, Microprocessor, DSP, ASIC, FPGA, or other logic circuitry programmed or otherwise configured to perform the various functions described above, such as broadcasting PBCH, transmitting SIBs and receiving an access request from a device. For example, the various functions described above may be embodied in the form of a computer program stored in the storage medium 908 and executed by the controller 906. The transmission/reception unit 904 is responsible for UE-specific signalling and broadcast messages under control of the controller 906.

To summarise, embodiments of the present invention allow, for devices such as MTC devices, the transmission of small data packets without the need to read all the System Information normally required to make an initial network access. Whilst reception of the MIB and preferably SIB1 would normally be required, this is not necessarily essential. The behaviour goes beyond existing methods specifically including the ability to notify the network that initial access is occurring from a device that was either specifically allowed to use a stored access configuration, or is accessing the cell using modified system information (such as SIB2) being broadcast by the cell.

The invention has been described with reference to LTE/LTE-A but could also be applied to other communications systems such as UMTS and WiMAX.

Any of the embodiments and variations mentioned above may be combined in the same system. Features of one embodiment may be applied to any of the other embodiments.

In any of the aspects or embodiments of the invention described above, the various features may be implemented in hardware, or as software modules running on one or more processors.

The invention also provides a computer program or a computer program product for carrying out any of the methods described herein, and a computer readable medium having stored thereon a program for carrying out any of the methods described herein.

A computer program embodying the invention may be stored on a computer-readable medium, or it may, for example, be in the form of a signal such as a downloadable data signal provided from an Internet website, or it may be in any other form.

It is to be understood that various changes and/or modifications may be made to the particular embodiments just described without departing from the scope of the claims.

INDUSTRIAL APPLICABILITY

The invention enables devices, particularly but not exclusively MTC devices, to access a wireless communication system without having to receive all the SI conventionally required in order to obtain the access parameters for an access request. It therefore contributes to efficient use of the system particularly in the Small Data Transmission scenario.

What is claimed is:

1. A method of accessing a wireless communication network by a device, the method comprising:
the device receiving a configuration information including an access parameter for gaining access to the network;
the device storing the configuration information including the access parameter;
the device transiting a Radio Resource Control (RRC) CONNECTED mode to an RRC_IDLE mode;
the device, in the RRC_IDLE mode, transmitting a first message for an access request to the network on the basis of the configuration information that is stored in the device; and
the device receiving from a base station a second message that indicates whether or not a connection between the base station and the device, based on the access parameter of the stored configuration information, is valid.

2. The method according to claim 1 further comprising the device attempting to receive the configuration information via a system information and deciding whether to use, for the access request, the stored configuration information based on received system information, depending on the outcome.

3. The method according to claim 1, further comprising the device indicating a failure to receive at least part of the system information.

4. The method according to claim 1 wherein the device holds a plurality of stored configuration information, the method further comprising the device selecting from among the plurality of stored configuration information, and indicating the selected stored configuration information used for the access request.

5. The method according to claim 1 wherein at least one of the indicating use of the stored configuration information, indicating a failure to receive at least part of the system information and indicating the selected stored configuration information are implicit in the access request.

6. The method according to claim 5 wherein the access request is a random access request including, selected by the device:
- a preamble from among a set of random access preambles; and/or
- a transmission timing from among a plurality of possible timings; and/or
- a transmission frequency from among a plurality of possible frequencies; and/or
- a duration in time from a plurality of possible durations; and/or
- an extent in frequency from among a plurality of possible frequency ranges; and/or
- a repetition sequence of signals such as preambles in the time and/or frequency domain from among a plurality of repetition sequences;
- the device indicating use of the stored configuration information and/or a failure to receive at least part of the system information by its selection(s).

7. The method according to claim 6 further comprising the network responding to the random access request with a random access response, and repeating transmission of the random access response if the device indicates a failure to receive system information.

8. The method according to claim 1, the configuration information including an indication of whether an access request based on a stored configuration will, or will not, be accepted by the network.

9. The method according to claim 8 wherein if the configuration information indicates that an access request based on the stored configuration information will not be accepted by the network, the device attempts to receive a transmission of further configuration information, the network repeatedly transmitting the further configuration information and the device repeating attempts to receive the further configuration information until it is successfully received.

10. The method according to claim 1 wherein wireless communication in the network takes place in time units of frames, each frame divided into a plurality of subframes, and the network decides whether or not to accept the access request based on one or more of:
- whether the access parameter used for the access request is valid;
- the subframe in which the access request was received; and
- whether or not the access request contains a specific signature assigned to the device.

11. A wireless communication system, comprising:
a base station of a wireless communication network; and
a device;
wherein the base station is configured to transmit configuration information including an access parameter for gaining access to the network;
the device is configured to:
  receive the configuration information including the access parameter;
  store the configuration information including the access parameter;
  transit a Radio Resource Control (RRC) CONNECTED mode to an RRC IDLE mode; and
  in the RRC_IDLE mode, transmit a first message for an access request to the base station on the basis of the stored configuration information;
the base station is configured to transmit to the device a second message that indicates whether or not a connection between the base station and the device, based on the access parameter of the stored configuration information, is valid; and
the terminal is configured to receive from base station the second message.

12. A base station for use in a wireless communication network, the base station comprising:
a transmitter configured to transmit configuration information including an access parameter for gaining access to the network; and
a receiver configured to receive, from a device, a first message, the first message being an access request on the basis of the configuration information by the device that has the configuration information and that has transited from a Radio Resource Control (RRC) CONNECTED mode to an RRC_IDLE mode,
wherein after receiving of the first message, the transmitter is configured to transmit to the device a second message that indicates whether or not a connection between the base station and the device, based on the access parameter of the configuration information, is valid.

13. A device for use as a terminal in a wireless communication network, the device comprising:
a transmitter/receiver configured to receive configuration information including an access parameter for gaining access to the network;
a memory configured to store the configuration information; and
processor circuitry configured to transit a Radio Resource Control (RRC) CONNECTED mode to an RRC_IDLE mode,
wherein the transmitter/receiver, in the RRC_IDLE mode, is configured to:
  transmit to a base station a first message for an access request on the basis of the stored configuration information; and
  after the transmitting of the first message to the base station, receive from the base station a second message that indicates whether or not the access parameter of the configuration information can be used for communication between the base station and the device.

14. A terminal for use in a wireless communication network, the terminal comprising
a receiver configured to receive from a base station a configuration information including an access parameter;
a memory configured to store in the memory the configuration information
controller circuitry configured to transit a Radio Resource Control (RRC) CONNECTED mode to an RRC_IDLE mode; and
a transmitter configured to, in the RRC_IDLE mode, transmit to the base station a first message for an access request,
wherein after the transmitting of the first message to the base station, the receiver is configured to receive from base station a second message that indicates whether or not the access parameter of the configuration information can be used for communication with the base station.

15. The terminal according to claim 14, the receiver is configured to attempt to receive the configuration information transmitted by the network, and
> the controller circuitry is configured to determine whether to transmit the access request using configuration information in place of the stored configuration information.

16. A base station for use in a wireless communication network, the base station comprising:
> a transmitter configured to transmit to a device a configuration information including an access parameter; and
> a receiver configured to receive from the device a first message, the first message for an access request by the device that has the configuration information and has transited from a Radio Resource Control (RRC) CONNECTED mode to an RRC IDLE mode,
> wherein after the receiving of the first message, the transmitter is configured to transmit to the device a second message that indicates whether or not the access parameter of the configuration information can be used for communication with the device.

17. The base station according to claim 16, wherein the transmitter is configured to transmit the configuration information via a system information that includes an indication of whether an access request based on the configuration information will, or will not, be accepted by the network.

* * * * *